United States Patent [19]

Gallacher

[11] 4,075,176
[45] Feb. 21, 1978

[54] CATALYSIS OF AMINO RESIN CROSS-LINKING REACTIONS WITH HIGH MOLECULAR WEIGHT SULFONIC ACIDS

[75] Inventor: Lawrence V. Gallacher, East Norwalk, Conn.

[73] Assignee: King Industries, Inc., Norwalk, Conn.

[21] Appl. No.: 683,778

[22] Filed: May 6, 1976

Related U.S. Application Data

[62] Division of Ser. No. 466,079, May 1, 1974, Pat. No. 3,979,478.

[51] Int. Cl.$^2$ .................... C08G 12/12; C08G 12/32; C08L 61/32
[52] U.S. Cl. .............................. 260/67.6 R; 260/70 R
[58] Field of Search ............. 260/67.6 R, 70 R, 70 A, 260/70 M

[56] References Cited

U.S. PATENT DOCUMENTS

| | | | |
|---|---|---|---|
| 2,222,506 | 11/1940 | Hodgins et al. | 260/70 |
| 2,226,518 | 12/1940 | Hodgins et al. | 260/70 |
| 2,227,223 | 12/1940 | Hodgins et al. | 260/70 |
| 2,322,979 | 6/1943 | Siegel | 260/70 |
| 2,323,357 | 7/1943 | Rosenblum | 260/70 |
| 2,326,265 | 8/1943 | Tawney | 260/70 |
| 2,327,984 | 8/1943 | West | 260/70 |
| 2,350,894 | 6/1944 | Honel | 260/70 |
| 2,631,138 | 3/1953 | Dannenberg | 260/834 |
| 2,764,548 | 9/1956 | King et al. | 252/33 |
| 3,265,645 | 8/1966 | Coney et al. | 260/834 |
| 3,267,174 | 8/1966 | Fry et al. | 260/848 |
| 3,310,416 | 3/1967 | Schibler | 260/849 |
| 3,804,920 | 4/1974 | Cunningham et al. | 260/850 |
| 3,957,859 | 5/1976 | Thielcke | 260/505 P |

FOREIGN PATENT DOCUMENTS

| | | | |
|---|---|---|---|
| 769,958 | 3/1957 | United Kingdom | 260/70 |

*Primary Examiner*—John C. Bleutge
*Attorney, Agent, or Firm*—Morgan, Finnegan, Pine, Foley & Lee

[57] ABSTRACT

Amino resins, e.g., ureaformaldehyde and melamine-formaldehyde thermosetting resin systems, are catalyzed with high molecular weight polyalkylaromatic polysulfonic acids, e.g., dinonylnaphthalene disulfonic acid and didodecylnaphthalene disulfonic acid. Resins cured with such catalysts provide surface coatings having superior properties. The catalyzed compositions can include other conventional ingredients, capable of co-reacting with the amino resins, such as polyols, polyacids, alkyd resins, polyester resins, and the like, to provide compositions curable to products having a wide range of properties.

16 Claims, No Drawings

CATALYSIS OF AMINO RESIN CROSS-LINKING REACTIONS WITH HIGH MOLECULAR WEIGHT SULFONIC ACIDS

This is a division of application Ser. No. 466,079 filed May 1, 1974 now U.S. Pat. No. 3,979,478.

This invention relates to superior catalysts for curing amino resins which are capable of curing by cross-linking reactions. More particularly, it relates to the use of very high molecular weight polyalkylaromatic polysulfonic acids for curing urea-formaldehyde and melamine-formaldehyde and similar thermosetting resin systems.

BACKGROUND OF THE INVENTION

Heat-convertible products obtained by reacting amino- or imino-group-containing compounds, e.g., ureas, amides, aminotriazines, and the like, with aldehydes, e.g., formaldehyde, benzaldehyde, etc. have been known for a number of years. Resins obtained by curing such condensation products, e.g., under the influence of heat, possess an excellent combination of physical properties and are widely used in glues, in molding compounds, as finishes for paper and textiles and as surface coatings. The convertible resins can be used per se or they can be further modified before curing, e.g., by alkylation with an alcohol, e.g., methanol or butanol, to provide for solubility and compatibility and/or by admixture with other materials capable of co-reacting therewith, such as compounds containing hydroxyl groups and carboxyl groups e.g., glycols, alkyd resins, polyester resins, and the like. This invention broadly is concerned with amino resins which are suitable for all conventional purposes. However, in its most preferred aspects, it is concerned with soluble forms or liquid forms of such amino resin products, which are well known to be superior as coatings for metals, and coatings or impregnants for cloth, paper, and the like. Such convertible resins commonly comprise urea-or melamine-aldehyde condensates or reaction products thereof with alcohols, e.g., methylol ureas, methylol melamines, and alkylated, e.g., methylated and butylated, derivatives thereof either alone or in a suitable solvent therefor. These specific amino resins are applied by coating onto three-dimensional substrates, e.g., metal, glass, plastics, such as appliance bodies, plastic windows, and the like, and then curing under the influence of heat. The mechanism of cure contemplated is by condensation and cross-linking to split out $H_2O$ or $ROH$ or $HCHO$, etc., and curing can be effected without a catalyst if long enough heating times — of the order of hours and days — are provided. However, for immediate curing, or for curing at more moderate temperatures, an acid is often added to function as a cross-linking catalyst. Among the acidic catalysts that have been used in the past with amino resins can be mentioned boric acid, phosphoric acids, acid sulfates, hydrochlorides, ammonium phosphates and polyphosphates, acid salts of hexamethylene tetramine, phthalic acid, oxalic acid, and the like. It is also known that sulfonic and sulfonyl halides are especially effective as catalysts in such compositions. A substantial number of such sulfonic acid compounds are illustrated in the Dannenberg patent, U.S. Pat. No. 2,631,138. All of them are of low to moderate molecular weights — none of them approach a molecular weight of 500. Moreover, while monoalkylaromatic polysulfonic acids and alkylaromatic polysulfonic acids are disclosed, there is no disclosure of polyalkylaromatic polysulfonic acids. The preferred catalyst as shown in the working examples of Dannenberg is p-toluenesulfonic acid, a monoalkylaromatic monosulfonic acid of moderate molecular weight, i.e., 172. U.K. Pat. No. 769,958 also discloses amino resin compositions containing curing catalysts, and specifically mentions as a preferred catalyst, p-toluenesulfonic acid. Coney et al, U.S. Pat. No. 3,265,645, also discloses compositions containing amino resins and states a specific preference for p-toluenesulfonic acid as the curing agent.

It has now been unexpectedly discovered that if compositions containing an amino resin are cured with high molecular weight polyalkylaromatic polysulfonic acid catalysts, specifically those having a molecular weight of greater than about 500, e.g., dinonylnaphthalene disulfonic acid, and the like, curing occurs much more rapidly at conventional temperatures than is achieved in the prior art at corresponding levels of catalyst. Moreover, the catalyzed compositions cure to thermoset systems which have superior properties in comparison with those cured with the catalysts of the prior art, possibly because the new catalysts become chemically bound into the resin, and for other reasons, e.g., improved compatibility.

While it is not clearly understood at this time why the above observed advantageous results have been obtained, it seems possible that by virtue of their unique solubility in both aqueous and non-aqueous systems, their high functionality, their high molecular weight, and inherent isomer distribution (because of the way in which they are made), polyalkylaromatic polysulfonic acids of such high molecular weight are superior to all conventional catalysts in a variety of amino resin systems over a wide range of concentrations. For example, it is known in coating technology that low molecular weight additives, including catalysts, can cause imperfections known as "fish-eyes" or "craters" in the cured system. This has been found to be alleviated by the use of high molecular weight polyalkylaromatic polysulfonic acids. Moreover, conventional catalysts such as p-toluene sulfonic acid have a tendency to crystallize out of certain systems during cure, and this mars the appearance of the cured resin. On the other hand, high molecular weight polyalkylaromatic polysulfonic acids are capable of having a very broad isomer distribution and unique solubility characteristics, — being soluble both in polar and non-polar solvents. They crystallize very slowly — if at all — and are superior in preventing marred appearances. Polysulfonic acids also, themselves, are capable of reacting with amino resins to form sulfomethylated covalently bonded structures. A monosulfonic acid can only form chain terminations, and therefore, it is not always desirable to use high concentrations of monosulfonic acids, such as the preferred p-toluenesulfonic acid of the prior art, with amino resin systems. However, polysulfonic acids are capable of giving chain extension in sulfomethylation, and this appears to lead to cured resin networks with superior physical properties, even if high sulfonic acid levels are used. At the same time, the high molecular weight and sluggish crystallization of the polyalkylaromatic polysulfonic acids appear to provide flexibility and toughness in all amino resin systems even if higher than usual concentrations are employed. Experiments have shown that in the instant polysulfonic acids, one of the acid groups is much stronger than the other(s). This is believed to have an important bearing on the unexpectedly good results obtained herein.

DESCRIPTION OF THE INVENTION

According to this invention, in its broadest aspects, there are provided compositions which comprise a convertible amino resin and a catalytically effective amount of a polyalkylaromatic polysulfonic acid having a molecular weight of at least about 500. Preferred, because of the ready availability of starting materials are dinonylnaphthalene disulfonic acid, the nonyl radicals of which are highly branched, M.W. about 540. Also preferred is didodecylnaphthalene disulfonic acid, the dodecyl radicals of which are highly branched, M.W. about 624.

The amino resin component can comprise, in general, an amino- or imino-group-containing compound condensed with an aldehyde or aldehyde precurser. In particular, one can employ a urea-formaldehyde condensate or a triazine-, e.g., melamine-formaldehyde condensate. All such amino resins are obtained in well known manners. Some are materials which are soluble in organic solvents or are capable of being converted to forms, e.g., ether derivatives, which are soluble in such solvents. Amino resin condensates particularly suited for use in the invention include those generally described as alkylated urea-formaldehyde condensates, by which term reference is made to urea-formaldehyde condensates containing subsequently etherified groups derived from alcohols. Urea-formaldehyde condensates are prepared, for example, by reacting formaldehyde with urea in the presence of an acid or alkaline medium so that a methylol urea is formed. This is heat convertible to a cured resin per se. On the other hand, if an alcohol is not present during the initial acid condensation, an alcohol and acid can subsequently be added after initial alkaline condensation. These latter procedures are suitable to alkylated urea-formaldehyde condensates derived from satured aliphatic alcohols of 2 to 8 carbon atoms, and particularly suitable for impregnation or use in combination with other co-reactants are urea-formaldehyde condensates obtained from methanol or n-butyl alcohol. These alkylated urea-formaldehyde condensates are soluble in $H_2O$, sometimes, and many solvents including hydrocarbons, ketones, esters and alcohols. Preparation of the condensates will not be reiterated here in detail since they have been repeatedly described in the prior art and the preparation is adequately disclosed in U.S. Pat. Nos. 2,222,506; 2,226,518; 2,227,223; 2,322,979; 2,327,984; 2,323,357; 2,326,265 and 2,350,894.

The triazine-aldehyde condensation products are also made in known ways. Any triazine having two or more amino groups can be reacted with any aldehyde, preferably in the presence of a mild alkaline catalyst in aqueous or non-aqueous media. They can also be reacted in a solvent, such as n-butanol, which produces an alkylated derivative. An excess of formaldehyde per mole of amino group is used. Among the amino triazines there can be used melamine, ammeline, 2-chloro-4,6-diamino-1,3-5-triazine, 2,4-diamine triazine, N,N-dimethyl melamine, and the like. The aldehyde component can comprise paraformaldehyde, acetaldehyde, paraldehyde, benzaldehyde, furfural, and the like. The solvent, if used, can vary widely and can include inert solvents, preferably those easily volatized, such as toluene, xylene, benzene, and the like, or, as mentioned, the solvent can be reactive with the condensation product, in the sense of producing alkylated products such as methanol, butanol, or the like.

As with urea resins, the triazine-based amino resins can be heat reactive products of the aldehyde and the triazine or can be modified, e.g., by reaction with an alcohol in an acidic medium, such as methanol or n-butanol to form the corresponding ethers, which are also heat convertible and somewhat more compatible with solvents and co-reactants. All such compositions can be made by those skilled in the art and many of them are commercially available, from a number of sources.

All of the amino resins can be modified with conventional amounts of conventional modifiers, such as polyols, alkyd resins, other resins, and the like. These add flexibility, different surface appearance, and modify resistance to chemicals, weathering, and the like, as is well known. Preferably, for coating purposes, the amino resins will be modified with glycols, such as triethylene glycol, in conventional amounts.

The curing of the present compositions is effected by admixing the polyalkylaromatic polysulfonic acid therewith and then subjecting the composition to heat. The curing is completed in comparatively short times, e.g., 12 to 48 hours. The cure is especially rapid at elevated temperature, e.g., from 5 minutes to 16 hours, at temperatures of about 100° C. to 250° C.

The polyalkylaromatic polysulfonic acid can vary widely in chemical nature, so long as it has a minimum molecular weight of about 500 and at least two alkyl groups and two sulfonic acid groups on an aromatic nucleus. If a phenyl nucleus is present, these requirements can be met with a benzenedisulfonic acid containing at least two alkyl groups having a total of 20 carbon atoms, e.g., didecylbenzenedisulfonic acid, or four alkyl groups having a total of 20 carbon atoms, e.g., tetrapentylbenzenedisulfonic acid. On the other hand, the phenyl group can be substituted with three sulfonic acid groups and two alkyl groups, in which case the two alkyl groups together will have a minimum of about 13 carbon atoms. Instead of a phenyl nucleus, the aromatic nucleus can be polycyclic, e.g., naphthalene, anthracene, phenanthrene, etc. Many variations in the position of substitution are possible and contemplated and mixed positional isomers are included. The alkyl substituents can be straight or branched chain. Best results are obtained with maximum variations in substituent locations and with maximum branching.

The most preferred polyalkylaromatic polysulfonic acids are branched alkyl substituted naphthalene polysulfonic acids. These are available, for example, by sulfonating polyalkylnaphthalenes. The polyalkylnaphthalenes can be made by alkylating naphthalene with olefins, for example, propylene trimer or tetramer, or alkyl halides, with a suitable catalyst, e.g., hydrogen fluoride or anhydrous aluminum chloride in a suitable solvent such as naphtha, sulfur dioxide, nitrobenzene or a mixture of benzene and nitrobenzene. See Robert G. King and George W. Thielcke, U.S. Pat. No. 2,764,548, assigned to the assignee of the present invention. Such a process produces naphthalene substituted with alkyl groups and, if a branched olefin is used, such as propylene trimer or propylene tetramer, — obtained by polymerizing propylene by an acid catalyst such as phosphoric acid, then the alkyl groups will be highly branched as well. Polysulfonation is obtained by treating the polyalkylaromatic with a sulfonating agent. For example, the dialkyl aromatic compound is dissolved in an inert solvent, such as petroleum naphtha, hexane, heptane, octane, chlorinated solvents, and the like, and sulfuric acid, preferably oleum, is introduced into the solution at the desired temperature and with agitation. After reaction is complete, the polysulfonic acid — and also some monosulfonic acid — is recovered by adding water to selectively extract the polysulfonic acid, then extracting the sulfonic acid from the water, e.g., by extraction with a water immiscible solvent such as pentanol, hexanol, heptanol, octanol, decanol, and the like. A detailed technique for preparing dinonylnaphthalene disulfonic acid, didodecylnaphthalene disulfonic acid and isomers and analogs thereof, including the benzene analogs, is described in the King et al patent, U.S. Pat. No. 2,764,548. A preferred, optional isolation procedure is described in the co-pending application of George W. Thielcke, Ser. No. 358,312, filed May 8, 1973, assigned to the assignee of this application, and incorporated herein by reference to save unnecessary detailed disclosure.

The polyalkylaromatic polysulfonic acids can be used per se or they can be diluted with mineral oil or a solvent, e.g., isopropanol, to facilitate measurement and mixing when preparing the catalyzed compositions of this invention.

It is preferred to employ such a proportion of curing catalysts that the compositions contain about 0.1 to 12% of the polyalkylaromatic polysulfonic acid based on the weight of the amino resin. When about 0.1 to 12% of polyalkylaromatic polysulfonic acid is employed, the resulting cured resinous product is hard and tough, and has outstanding resistance against the deteriorating and destructive action of heat and chemicals, particularly alkalies. The cured resinous products produced from the compositions of the invention are thus of great value as surface coating films and impregnants, for the protection of metal surfaces which come into repeated contact with alkaline materials such as soapy water, as is the case with washing machine, and in making heat resistant paper based laminates, e.g., for bar- and countertops. If more than about 12% of curing agent is used, chemical resistance tends to be adversely effected, but, on the other hand, other properties such as weather resistance will be improved because the polysulfonic acid seems to enter into the resin structure. In any event, the use of the polyalkylaromatic polysulfonic acid in amounts of about 0.1 to 12% with proper time and temperature for completion of cure gives a resinous product having a very tight cure and insolubility in all non-destructive organic solvents such as methyl ethyl ketone, for example. A more preferred range of catalyst concentration is from about 0.2 to 6%.

Although not essential, it is generally preferred to effect the mixing of the curing catalyst with the amino resin condensate and, if used, a co-reactant, all in water or a solvent. The urea and melamine condensates as well as glycol, polyether, alkyd resin and other co-reactive additives are soluble in a variety of solvents including ketones, such as acetone, methyl ethyl ketone, methyl isobutyl ketone, isophorone, etc.; esters, such as ethyl acetate, butyl acetate, ethylene glycol mono ethyl ether acetate; etc.; ether alcohols, such as methyl, ethyl or butyl ether or ethylene glycol or diethylene glycol; and chlorinated solvents, such as trichloropropane, chloroform, etc. Alcohols such as ethanol, isopropanol, n-butanol, etc. are also used by themselves in some cases. To save expenses, the most efficient, non-alcoholic solvents are ordinarily used in admixture with diluents which are themselves not universal solvents when used alone, but which may be incorporated with active solvents. Reference is made in this respect to aromatic hydrocarbons, such as benzene, toluene, xylene, aromatic petroleum thinner, etc.; and alcohols recited above. For use in coatings and impregnants, in order to achieve desired evaporation and drying characteristics, the solvents used with the present compositions are combined and balanced for desired properties in the manner well known in the lacquer, varnish and laminating arts. It is also often convenient to add the polyalkylaromatic polysulfonic acid as a solution in an organic solvent such as esters like ethyl acetate, n-butyl acetate, or Cellosolve acetate; alcohols such as ethanol, isopropanol and n-butanol; or ketones such as acetone or methyl ethyl ketone, as well as mixtures of two or more of such liquid compounds. Isopropanol is especially convenient.

Conventionally, the amino resins, the polyalkylaromatic polysulfonic acid catalyst and if present, co-reactants, may contain various other materials such as pigments, colorants, fillers, and the like. Pigments such as titanium dioxide, antimony oxide, lead oxide, carbon black, chrome yellow, zinc oxide, para red, and the like, can be used in the compositions. Best results in preparing enamels are obtained by grinding the pigment with a portion of the solvent and amino resin and then adding the remainder of the solvent and, e.g., a glycol, an alkyd resin, other polyester resins, etc. after the grinding operation. Th enamel is ready for application after addition of the desired amount of the polyalkylaromatic acid.

When varnishes, lacquers or enamels are prepared from the composition of this invention, layers of suitable thickness of the film-foaming material may be applied to a surface such as metal, wood, or the like. Curing completely therethrough is attained because the conversion to an insoluble film is not dependent upon contact with air. This fact also makes the compositions valuable in manufacture of laminates wherein the laminea are cloth, paper, glass-cloth, and the like. Such laminea are impregnated with a solution of the amino resin and curing catalyst, optionally with co-reactants. After drying, the impregnated sheets are stacked and cure is effected in a heated press.

Many of the catalyzed amino resin compositions are also suitable for molding operations wherein they are introduced into a mold, compressed and the cure completed with heat. Various fillers, dyes and pigments may be incorporated with the compositions in use for molding operations such as wood flour, talc, alpha-cellulose, zinc sulfide, etc. All such techniques are well known to those skilled in this art.

Also contemplated are compositions in which the polyalkylaromatic polysulfonic acid is in the form of a thermally-decomposable adduct, e.g., with an inorganic or organic base, such as an ammonium salt, an aniline salt, or a triethanolammonium salt. Such adducts are conventional in this art, and, when formulated into the composition, provide longer shelf lives, because the catalyst is not formed until the composition is heated to curing temperature, whereupon the adduct breaks down into the polysulfonic acid form.

DESCRIPTION OF THE PREFERRED EMBODIMENTS

The following examples illustrate compositions within the scope of the present invention. They are not to be construed as being limiting in any manner whatsoever. All parts are by weight.

EXAMPLE 1

A blend of 25 parts of liquid hexamethoxymethylmelamine resin (American Cyanamid Co., Cymel 303) and 12 parts of a triethylene glycol co-reactant is prepared. A 37 gram portion of the blend is weighed out and 0.2 grams of dinonylnaphthalene disulfonic acid, as a 20% solution in isopropanol, is added. The composition is coated onto a glass plate, placed in a 100° C. oven and, after 30 minutes, a very hard and glossy cured coating is produced.

COMPARATIVE EXAMPLE A

A blend of 25 parts of liquid hexamethoxymethylmelamine resin (American Cyanamid Co., Cymel 303) and 12 parts of triethylene glycol is prepared. 37 grams of this blend, without any catalyst, is coated on a glass plate, placed in a 100° C. oven and examined after 30 minutes and after 16 hours. The composition remains soft and sticky and there is no evidence of cure.

COMPARATIVE EXAMPLE B

A blend of 25 parts of liquid hexamethoxymethylmelamine resin (American Cyanamid Co., Cymel 303) and 12 parts of triethylene glycol is prepared. A 37 gram portion of the blend is treated with 0.13 gram of para-toluene sulfonic acid as a 20% solution in isopropanol. The composition so produced is coated onto a glass plate, placed in a 100° C. oven. After 16 hours at 100° C., a very hard and glossy cured coating has been produced on the surface of the glass plate.

EXAMPLE 2

A blend of 25 parts of liquid hexamethoxymethylmelamine resin (American Cyanamid Co., Cymel 303) and 12 parts of triethylene glycol is prepared. A 37 gram portion of the blend is mixed with 0.28 grams dinonylnaphthalene disulfonic acid as a 20% solution in isopropanol. The composition is coated onto a glass plate, placed in a 100° C. oven and, after 30 minutes, there is produced a very hard and glossy cured coating on the surface of the glass plate.

EXAMPLE 3

25 parts of liquid hexamethoxymethylmelamine resin (American Cyanamid Co., Cymel 303) is mixed with 0.2 parts of dinonylnaphthalene disulfonic acid as a 20% solution in isopropanol. The composition is coated onto a glass plate, placed in a 100° C. oven and, after 30 minutes, a hard, glossy coating of cured resin is produced on the surface of the glass plate.

EXAMPLES 4-9

A clear stock solution of 100 g. Amberlac 292X, 10 g. of Cymel 303, 15 g. of n-butanol and 15 g. of xylene is prepared. Cymel 303 has been described above; Amberlac 292X is a 50% solids solution of a hydroxyl-functional alkyd resin in xylene manufactured by Rohm & Haas. A 13% solution of dinonylnaphthalene disulfonic acid (DNNDSA) in isopropanol is prepared. For comparison purposes, a 8.3% solution of toluenesulfonic acid (TSA) in isopropanol is also prepared (to give the same content of sulfonic acid groups as the DNNDSA solution on a weight basis). Using these solutions and ingredients, the following compositions are mixed, applied as thin coatings on clean glass plates, and given 10, 20, 30 and 60 minute cures at 212° F.:

| Example Composition (parts by weight) | C* | D* | E* | 4 | 5 | 6 | F* | 7 | 8 | 9 |
|---|---|---|---|---|---|---|---|---|---|---|
| Stock solution | 10 | 10 | 10 | 10 | 10 | 10 | 10 | 10 | 10 | 10 |
| Cymel 303 | — | — | — | — | — | — | — | 2 | 2 | 2 |
| TSA solution | 1.2 | 0.6 | 0.3 | — | — | — | — | — | — | — |
| DNNDSA solution | — | — | — | 1.2 | 0.6 | 0.3 | — | 1.7 | .84 | .42 |
| Catalyst as % of resin solids | 2.3 | 1.2 | 0.6 | 3.6 | 1.8 | 0.9 | — | 3.6 | 1.8 | 0.9 |

*For comparative purposes

All of the catalyzed coatings appear to be tack-free and clear after 10 minutes. However, the coatings prepared with the lowest catalyst levels show further improvement at longer cure times. The uncatalyzed coating, F, appears to have some residue tack even after long cure times.

All of the plates are immersed in a 1% aqueous detergent (TIDE, Proctor and Gamble) solution for 50 hours at 165° F. and examined immediately after removal. The systems of C-E, cured with TSA show a pronounced whitening, particularly at higher catalyst levels. This effect is much less with DNNDSA (Examples 4-9). In fact, Coating 4, with 3.6% DNNDSA is equivalent to coating E with 0.6% TSA in clarity. All of the TSA coatings are badly swollen (C is worst), virtually off the glass. The DNNDSA coatings are clearly superior in this respect, Example 4 being equivalent to Trial E. Finally, the DNNDSA-cured coatings all retain significantly more gloss after this prolonged treatment with hot detergent.

Uncatalyzed resin system F is nearly opaque after the test with no gloss retention. However, this coating seems to retain more adhesion than the catalyzed systems, perhaps because the coating fails locally in swelling rather than showing wrinkles.

The cure time data demonstrate that the DNNDSA systems cure faster to coatings which are more resistant to whitening than those cured with TSA. In fact, the coating of Example 4, with the highest level of DNNDSA is fully cured after 20 minutes at 212° F. None of the TSA-cured coatings are fully cured in 20 minutes, by this test.

EXAMPLES 10-15

The procedure of Examples 4-9 is repeated, substituting for the AMBERLAC 292 alkyd resin, another resin designated Acryloid AT-56. This is a 50% solids in xylene-butanol, hydroxyl-functional type thermosetting acrylic resin manufactured by Rohm and Haas Company, Philadelphia, Pa. Two stock solutions are prepared comprising, by weight:

| Stock Solution | A | B |
|---|---|---|
| Acryloid AT-56 | 200 | 100 |
| Cymel 303 | 30 | 25 |
| n-butanol | 30 | 15 |
| xylene | 30 | 15 |

The formulations are catalyzed with 13% DNNDSA solution in isopropanol and with 8.3% TSA solution in isopropanol. One is not catalyzed, for control purposes. The compositions applied to glass plates and cured by the schedule of Examples 4-9 are as follows:

| Example Composition (parts by weight) | G* | H* | I* | 10 | 11 | 12 | J* | 13 | 14 | 15 |
|---|---|---|---|---|---|---|---|---|---|---|
| Stock Solution A | 14.5 | 14.5 | 14.5 | 14.5 | 14.5 | 14.5 | 14.5 | — | — | — |
| Stock Solution B | — | — | — | — | — | — | — | 14.5 | 14.5 | 14.5 |
| TSA solution,% Catalyst (RSO₃ based on resin solids) | 2.0 | 1.0 | 0.5 | — | — | — | — | — | — | — |
| DNNDSA solution,% catalyst (RSO₃ based on resin solids) | — | — | — | 3.2 | 1.6 | 0.8 | — | 3.2 | 1.6 | 0.8 |

*Comparative trials

The cured coatings are tested as described above. The hot detergent solution resistance test data demonstrate that DNNDSA is superior to TSA as a curing agent because the gloss of the exposed film is better.

As to adhesion, the systems cured with TSA tend to be lower because there appears to be a greater tendency to swell.

As to clarity, Examples 10 and 11 are better than counterparts G and H.

Without any catalyst at all (J), the coating disintegrates at all cure times, in this test.

EXAMPLE 16

A urea-formaldehyde resin system is catalyzed with DNNDSA. 1.61 grams of a 13% solution of dinonylnaphthalene disulfonic acid is stirred into 30 grams of a water-based urea-formaldehye resin containing 65% resin solids (Casco ® Resin 5H, Borden, Inc.) A thin coating of this mixture is deposited on an aluminum panel. A second panel is coated with uncatalyzed urea-formaldehyde resin. Both panels are placed in a 100° C. forced-draft oven for 5 minutes and then cooled. The catalyzed coating is hard and tack-free, while the uncatalyzed coating is still soft and tacky.

EXAMPLE 17

DNNDSA in a latent form, as the salt of dimethylaminoethanol (DMAE) is used as a catalyst. A basic salt of DNNDSA and DMAE is prepared by combining 7.65 grams of powdered DNNDSA, 23 grams of isopropanol and 3.9 grams of DMAE to form a clear solution with a 70% excess of free DMAE. 0.5 grams of this solution is mixed with 20 grams of the following, by weight:

| | |
|---|---|
| Cymel 303 | 15 |
| Amberlac 292X | 50 |
| n-Butanol | 7 |
| xylene | 7 |

The resulting mixture contains 1% DNNDSA based on resin solids in latent form. Aluminum panels are coated with the catalyzed system, and other panels are coated with the same system without catalyst. The coatings are cured for 5 minutes at 200° C., a temperature high enough to liberate and volatilize the DMAE from the amine salt. The catalyzed coatings are hard and absolutely tack-free after removal from the oven. The uncatalyzed coatings retain a noticeable tack when taken from the oven after 5 minutes, thus confirming the effectiveness of the latent catalyst.

EXAMPLE 18

An alkyd/melamine system is catalyzed with didodecylnaphthalene disulfonic acid (DDNDSA). A clear solution of 100 grams Amberlac 292X alkyd resin, 10 grams Cymel 303 melamine resin, 15 grams n-butanol and 15 grams xylene is prepared. To 100 grams of this solution is added 3.3 grams of a 15% solution of DDNDSA in isopropanol. The solution is mixed well and then applied to an aluminum panel as a thin coating. The coating is cured for 30 minutes at 100° C. to produce a hard, glossy coating with excellent resistance to 1% Tide solution in the standard 50 hour test at 165° F.

It is obvious that other modifications can be made in the above specific examples without departing from the spirit or scope of the invention. For example, instead of using triethylene glycol as a co-reactant for the amino resin, oil-modified alkyd resins, such as those described in U.K. 769,958, can be used with dinonylnaphthalene disulfonic acid or didodecylnaphthalene disulfonic acid as described in the examples. Instead of dinonylnaphthalene disulfonic acid, a thermally-decomposable adduct, for example, triethanolammonium dinonylnaphthalene disulfonate can be used.

All obvious modification and variations which will suggest themselves to those skilled in the art in the light of the above detailed description are included within the scope of the present invention. The invention is to be defined by the appended claims.

I claim:

1. A composition comprising a convertible amino resin and a catalytically effective amount of a thermally-decomposable adduct of a polyalkylaromatic polysulfonic acid, having a molecular weight of at least about 500.

2. A composition as defined in claim 1 wherein said adduct comprises a N,N-dimethylhydroxyethylammonium salt of dinonylnaphthalene disulfonic acid.

3. A composition as defined in claim 1 wherein said polyalkylaromatic polysulfonic acid is dinonylnaphthalene disulfonic acid, the nonyl radicals of which are highly branched.

4. A composition as defined in claim 1 wherein in said adduct said polyalkylaromatic polysulfonic acid comprises from about 0.1 to 12% by weight based upon the weight of resin solids.

5. A composition as defined in claim 4 wherein the concentration of polyalkylaromatic polysulfonic acid in said adduct is from about 0.2 to 6% by weight based on the weight of resin solids.

6. A composition as defined in claim 1 wherein said convertible amino resin is a urea condensate.

7. A composition as defined in claim 6 wherein said urea condensate is dissolved in a solvent.

8. A composition as defined in claim 1 wherein said convertible amino resin is a melamine condensate.

9. A composition as defined in claim 8 wherein said melamine condensate is dissolved in a solvent.

10. A composition as defined in claim 1 wherein said convertible amino resin is modified with an alcohol.

11. A composition as defined in claim 1 wherein said convertible amino resin is selected from the group consisting of urea condensates and melamine condensates.

12. A composition as defined in claim 1 wherein said adduct is an ammonium salt of said polyalkylaromatic polysulfonic acid.

13. A composition as defined in claim 1 wherein said adduct is an aniline salt of said polyalkylaromatic polysulfonic acid.

14. A composition as defined in claim 1 wherein said adduct is a triethanolammonium salt of said polyalkylaromatic polysulfonic acid.

15. A coating composition, the constituents of which comprise (i) an alkoxylated melamine formaldehyde resin; and (ii) an adduct of dinonylnaphthalene disulfonic acid wherein said acid comprises 0.1 - 6% by weight, based on the weight of resin solids.

16. A composition as defined in claim 15 wherein said resin is a methylolated melamine formaldehyde resin.

* * * * *